United States Patent
Joecken et al.

(10) Patent No.: US 9,267,052 B1
(45) Date of Patent: Feb. 23, 2016

(54) SEALING AGENT

(71) Applicant: James Hardie Technology Limited, Dublin (IE)

(72) Inventors: John Joecken, Fontana, CA (US); Weiling Peng, Fontana, CA (US); Van Nguyen, Fontana, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 14/034,090

(22) Filed: Sep. 23, 2013

Related U.S. Application Data

(60) Provisional application No. 61/705,084, filed on Sep. 24, 2012.

(51) Int. Cl.
| | | |
|---|---|---|
| *C09D 163/00* | (2006.01) | |
| *C08K 3/10* | (2006.01) | |
| *C09D 125/08* | (2006.01) | |
| *C09D 179/00* | (2006.01) | |

(52) U.S. Cl.
CPC ............ *C09D 125/08* (2013.01); *C09D 163/00* (2013.01); *C09D 179/00* (2013.01)

(58) Field of Classification Search
CPC ........... C09D 5/34; C09K 3/10; C09K 3/1006
See application file for complete search history.

(56) References Cited

U.S. PATENT DOCUMENTS

| | | | | |
|---|---|---|---|---|
| 3,993,798 | A * | 11/1976 | Brose et al. ................... | 427/500 |
| 6,376,570 | B1 * | 4/2002 | Zhao et al. ...................... | 522/42 |
| 2002/0146515 | A1 * | 10/2002 | Schwartz et al. ............. | 427/409 |
| 2007/0055002 | A1 * | 3/2007 | Campbell et al. ............. | 524/500 |
| 2009/0220700 | A1 * | 9/2009 | Peres ........................ | 427/407.1 |

FOREIGN PATENT DOCUMENTS

| | | | | |
|---|---|---|---|---|
| JP | 2000281943 A | * | 10/2000 | |
| JP | 2000287943 A | * | 10/2000 | |
| WO | WO 2011065813 A1 | * | 6/2011 | |

OTHER PUBLICATIONS

Machine translated English language equivalent of JP 2000-287943 (Oct. 2000, 15 pages).*
Machine translated English equivalent of JP 2000-281943 (Oct. 2000, 15 pages).*

* cited by examiner

*Primary Examiner* — Brieann R Fink
(74) *Attorney, Agent, or Firm* — Knobbe, Martens, Olson & Bear, LLP

(57) ABSTRACT

Disclosed herein are coating agents and methods of manufacturing coated products with such coating agents. The disclosed coating agents may include at least one resin, at least one filler selected from the group comprising natural mineral and synthetic mineral, and at least one chemical agent, wherein the at least one chemical agent is at least one pigment selected from the group comprising inorganic pigment and organic pigment.

14 Claims, 2 Drawing Sheets

SEALING AGENT

BACKGROUND OF THE INVENTION

1. Field of the Invention

Embodiments of the disclosed invention relate generally to a coating agent, in particular a sealing coating agent suitable for use with composite building materials comprising cementitious materials, gypsum, or other suitable inorganic building materials such as those containing cellulose, glass, steel or polymeric fibers.

2. Description of the Related Art

In the construction industry, building materials are often prefinished with coating systems or laminates prior to sale and installation. Economies of scale typically permit a manufacturer to coat or laminate materials at a lower cost and to a higher standard than an end user of unfinished material. A manufacturer therefore has complete control over the quality and consistency of the prefinished products leaving the factory. This ensures that each prefinished product has a predictable service lifetime. Such materials are easily installed and do not require subsequent finishing. Thus prefinished siding planks and panels are particularly popular due to reduced labor costs and time saved during installation.

Different types of sealing agents have been developed to seal the cementitious products. Generally, it is very difficult to apply a paint coat directly onto a sealing agent, as a sealing agent does not provide sufficient adhesion for direct application of a paint coat. Furthermore, in practice, transparent sealing agents are often applied to the cementitious product prior to application of the primer coat or layer. It is sometimes difficult to visually ensure that the sealing agent has adequate coverage on the product prior to application of the primer coat or layer. Consequently if the sealing agent or sealer coat or layer is not applied correctly the performance of further layers or coats will be affected. Furthermore, it is thought that some clear sealing agents are potentially susceptible to degradation by ultra-violet (UV) light. Accordingly, such sealing agents will not provide an adequate adhesion surface for the priming agent or further coats on cementitious materials.

SUMMARY OF THE INVENTION

It is therefore an object of the disclosure to provide a sealing coating agent suitable for use with composite building products.

For the purpose of this specification, the term 'comprise' shall have inclusive meaning that it should be taken to mean an inclusion of not only the listed components it directly references, but also other non-specified components. Accordingly, the term 'comprise' is to be attributable with as broad an interpretation as possible and this rationale should also be used when the terms 'comprised' and/or 'comprising' are used.

It is to be understood that the terms 'sealing agent' and 'sealer' are used interchangeably throughout the specification to refer generally to a coating that is applied to the surface of a material for purposes such as protecting the exposed surface from environmental effects or the like.

Further aspects or embodiments of the present disclosure will become apparent from the ensuing description which is given by way of example only.

In one embodiment, the present disclosure provides a coating agent that is suitable for use as a sealing agent. In one implementation, the coating agent comprises at least one resin and at least one chemical agent. In another implementation, the coating agent is a sealing agent.

In another embodiment, the coating agent further comprises at least one pigment to provide a colored or tintable coating agent. In a further embodiment, the at least one chemical agent also functions as a pigment. It is to be understood that the terms 'colored' and 'tintable' are used interchangeably throughout the specification to generally refer to a coating agent comprising at least one pigment.

One of the advantages of the colored or tintable coating agent described in the present disclosure is that use of a pigment within the coating agent enables a manufacturer to visually inspect that the coating agent has been applied uniformly to a product. A further advantage is that, in some embodiments, the optionally tintable coating agent does not degrade on application of UV light.

In a further embodiment of the disclosure, the at least one resin is selected from the group consisting of aromatic isocyanates, aliphatic isocyanates, blocked isocyanates, an epoxy, silicones, siloxanes, silanes, polyurethanes, acrylates, acrylics, polyester, fluoropolymers, fluorinated acrylics, and styrene acrylics or combinations of the same. Optionally the at least one resin comprises a water based resin or a solvent based resin.

In a further embodiment of the disclosure, the at least one resin is a UV curable or moisture curable resin.

In some embodiments, the resin solids comprise between 2.0%±0.5% and 99.5%±0.5% of the formulation of the coating agent by weight, and more preferably comprise between 5.0%±0.5% and 99.5%±0.5% of the formulation of the coating agent by weight.

In a further embodiment of the disclosure, the at least one filler is selected from the group consisting of natural minerals, and synthetic minerals, wherein the group of natural minerals comprise oxides, silicates, hydrated silicates, titanates, carbonates, sulfates and hydroxides and the group of synthetic minerals comprise oxides of silicon, aluminium, magnesium, titanium, iron, zinc, yttrium and zirconium.

In some embodiments, the filler comprises between 0.5%±0.5% and 80%±0.5% of the formulation of the coating agent by weight.

In a further embodiment of the disclosure, the at least one pigment is selected from one or more of the group consisting of inorganic pigments and organic pigments, wherein the inorganic pigment is selected from the group consisting of Han Purples, Ultramarines, Cobalt Violets, Cobalt Blues, Cerulean Blues, Egyptian Blues, Han Blues, Prussian Blues, Azurites, Malachites, Cadmium Greens, Viridians, Verdigris, Chrome Greens, Paris Greens, Scheele's Greens, Orpiments, Cadmium Yellows, Chrome Yellows, Cobalt Yellows, Yellow Ochres, Naples Yellows, Titanium Yellows, Titanium Beiges, Cadmium Oranges, Chrome Oranges, Cadmium Reds, Venetian Reds, Red Ochres, Burnt Siennas, Vermilions, Red Leads, Burnt Ochres, Raw Umbers, Burnt Umbers, Raw Siennas, Carbon Blacks, Ivory Blacks, Vine Blacks, Lamp Blacks, Iron Blacks, Titanium Blacks, Antimony Whites, Barium Sulfates, White Leads, Titanium Whites, and Zinc Whites and the organic pigment is selected from the group comprising Fast Yellows, Permanent Yellows, Brilliant Yellows, Fast Oranges, Permanent Oranges, Toluidene Reds, Permanent Reds, Scarlet Reds, Fast brilliant Reds, Fast Rose Reds, Fast Reds, Red Lakes, Carmine Reds, Lithol Rubbines, Fast Bordeaux, Fast Pinks, Fast Violets, Cyanine Blues, Cyanine Greens, and combinations thereof.

In some embodiments, the at least one pigment comprises between 2%±0.5% and 79.5%±0.5% of the formulation of the coating agent by weight.

In some embodiments, the at least one pigment comprises Titanium Dioxide and at least one other pigment selected from the group consisting of inorganic pigments and organic pigments, wherein the inorganic pigment is selected from the group consisting of Han Purples, Ultramarines, Cobalt Violets, Cobalt Blues, Cerulean Blues, Egyptian Blues, Han Blues, Prussian Blues, Azurites, Malachites, Cadmium Greens, Viridians, Verdigris, Chrome Greens, Paris Greens, Scheele's Greens, Orpiments, Cadmium Yellows, Chrome Yellows, Cobalt Yellows, Yellow Ochres, Naples Yellows, Titanium Yellows, Titanium Beiges, Cadmium Oranges, Chrome Oranges, Cadmium Reds, Venetian Reds, Red Ochres, Burnt Siennas, Vermilions, Red Leads, Burnt Ochres, Raw Umbers, Burnt Umbers, Raw Siennas, Carbon Blacks, Ivory Blacks, Vine Blacks, Lamp Blacks, Iron Blacks, Titanium Blacks, Antimony Whites, Barium Sulfates, White Leads, Titanium Whites, and Zinc Whites and the organic pigment is selected from the group comprising Fast Yellows, Permanent Yellows, Brilliant Yellows, Fast Oranges, Permanent Oranges, Toluidene Reds, Permanent Reds, Scarlet Reds, Fast brilliant Reds, Fast Rose Reds, Fast Reds, Red Lakes, Carmine Reds, Lithol Rubbines, Fast Bordeaux, Fast Pinks, Fast Violets, Cyanine Blues, and Cyanine Greens, and combinations thereof.

In some embodiments, the tintable sealing agent comprises a Pigment Volume Concentration (PVC) between 2%±0.5% and 70%±0.5% and more preferable the Pigment Volume Concentration (PVC) is between 3%±0.5% and 40%±0.5%. It is to be understood by the person skilled in the art that the weight addition of the at least one pigment in the coating agent of the preferred embodiments does not exceed the critical PVC for the coating agent.

In a further embodiment of the disclosure, the coating agent comprises polymeric hexamethylene isocyanate and between 5 to 10% Titanium Dioxide.

In yet another aspect, some embodiments comprise incorporating filler and pigment in tinted sealer formulation. The filler and pigment include commonly used filler and pigment used in primer and house paints, such as titanium dioxide, inorganic color pigments, organic color pigments, clays, talc, calcium silicate, silica etc. The preferred amount of filler and pigment in multifunctional sealer is 2 to 70 wt %.

In a further embodiment of the disclosure, the coating agent further comprises at least one additive selected from the group consisting of surfactants, dispersants, defoamers, catalysts, solvents, coalescing agents, amines, preservatives, biocides, mildewcides, fungicides, glycols, colorants, dyes, thickeners, heat stabilisers, leveling agents, anti-cratering agents, curing indicators, plasticisers, sedimentation inhibitors, photoinitiators, UV absorbers, optical brighteners, anti-corrosion agents, and combinations thereof.

In some embodiments, the at least one additive is present at a combined total additive percentage of between 0% and 10%±0.5% of the formulation of the coating agent by weight.

In another embodiment of the disclosure, there is provided a coated composite product comprising a composite substrate; at least one coating layer comprising a coating agent, wherein the coating agent comprises at least one resin and at least one chemical agent, wherein each coating layer is applied to at least a portion of the composite substrate and at least partially cured, and wherein the coating layer provides an improved bond to the composite substrate and to any applied top coat.

A further advantage of the sealing agent according certain embodiments of the disclosure as described herein is that it provides very good wet and dry adhesion when applied to a composite building material.

In another embodiment of the disclosure, the coating agent further comprises at least one pigment to provide a tintable coating agent.

In another embodiment of the disclosure, there is provided a coated composite product, wherein the Dry Film Thickness (DFT) is between 0.05 and 5 mils (DFT) and more preferably between 0.1 and 3 mils (DFT). It is to be understood that the Dry Film Thickness of the coating layer applied is not limited to these values and that it can be altered as required by a person skilled in the art to obtain the required physical properties of the coated composite product.

In a further embodiment of the disclosure, the coating agent is applied to a composite product such that the dry film thickness on the board is between 0.4 mil and 1 mil DFT.

In another embodiment of the disclosure, the composite substrate is selected from the group consisting of cementitious composites, gypsum composites, geopolymer composites wood composites and fiber-reinforced composites. Optionally the fiber reinforced composite substrate can be an engineered cement composite substrate or a cementitious fiber cement composite substrate.

In a further embodiment of the disclosure, the coated product further comprises at least one top coat coating layer applied to the coated product. Optionally the at least one top coat coating layer is at least partially cured.

In a further embodiment of the disclosure, there is provided a method of manufacturing a coated product, the method comprising the steps of: (a) providing a composite substrate; (b) applying at least one layer of a coating composition comprising a coating agent to at least a portion of the composite substrate, wherein the coating agent comprises at least one resin and at least one chemical agent, and (c) at least partially curing each coating layer prior to applying any further coating layers.

In another embodiment of the disclosure, the coating agent is a combined sealing agent and priming agent.

In another embodiment of the disclosure, the coating agent further comprises at least one pigment to provide a colored or tintable coating agent.

In a further embodiment of the disclosure, the method of partially curing a coating composition layer comprises exposing the coated composite substrate to at least one of the group comprising heat, moisture, UV radiation, NIR radiation, IR radiation, RF radiation, gamma ray radiation and electron beam radiation.

In a further embodiment of the disclosure, the coating agent is cured on the composite product for a period between 3 and 4 hours at a temperature of approximately 140° F.

BRIEF DESCRIPTION OF THE DRAWINGS

For more complete understanding of the features and advantages of the disclosures described herein, reference is now made to a description of the disclosure along with accompanying figures, wherein.

DETAILED DESCRIPTION

Figure 1:
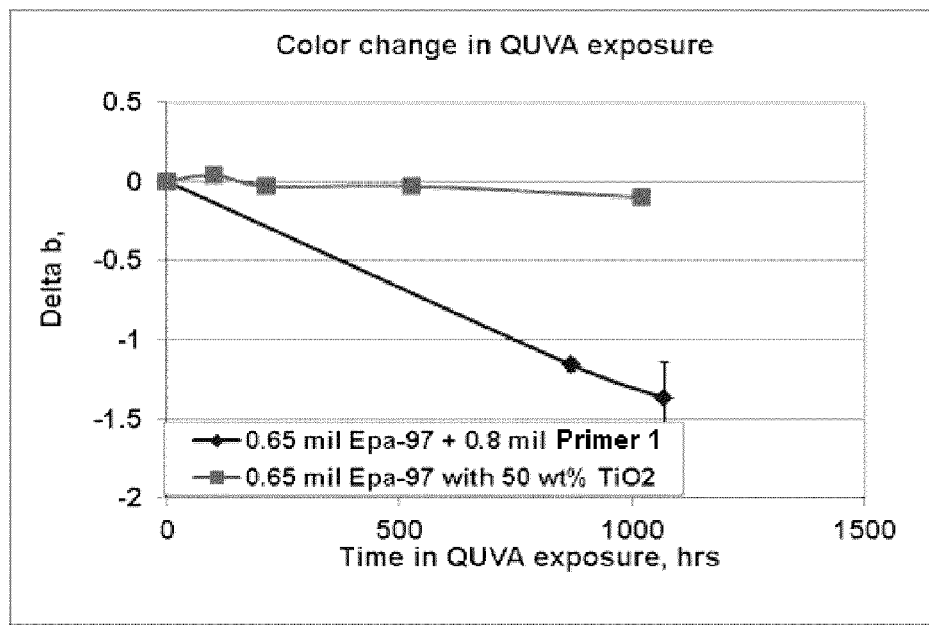
FIG. 1 depicts a representative curve showing color change of a tinted sealer formulation described herein on a face of a composite building material under QUV exposure, and comparing with the clear sealer plus primer on the same.

Referring now to the drawings, a number of samples of coating agents prepared according to certain embodiments described in the disclosure were prepared and tested in accordance to Examples 1 to 4 given below.

General Testing Information:

In each example given below, determination of both wet adhesion and dry adhesion of the coating agent on composite building material specimens was conducted as follows. The coating agent according to certain embodiments of the disclosure as outlined in the examples given below was applied to the face of a composite building material specimen. The coating agent was then partially cured.

Each coating agent was applied as a single layer. A topcoat was applied to the cooled and cured specimens to a Dry film thickness (DFT) of between approximately 1.6 mil to 2 mil. For wet adhesion, each coated specimen was subsequently soaked for approximately 24 hours in water. Water was then removed from the surface of each specimen after soaking.

The dry adhesion tape test follows the same process as the wet adhesion test outlined above without the step of soaking the samples in water for approximately 24 hours.

Adhesion values were measured using 3M™ #250 Scotch® masking tape approximately 1" wide. Tape was applied to the surface of a specimen and manually pressed down into textured surface. The specimen and tape were rolled with a 10 pound roller. The tape was then quickly removed from the specimen. In each case between three to six examples of each coating agent on a specimen was tested.

Example 1

Figure 3:
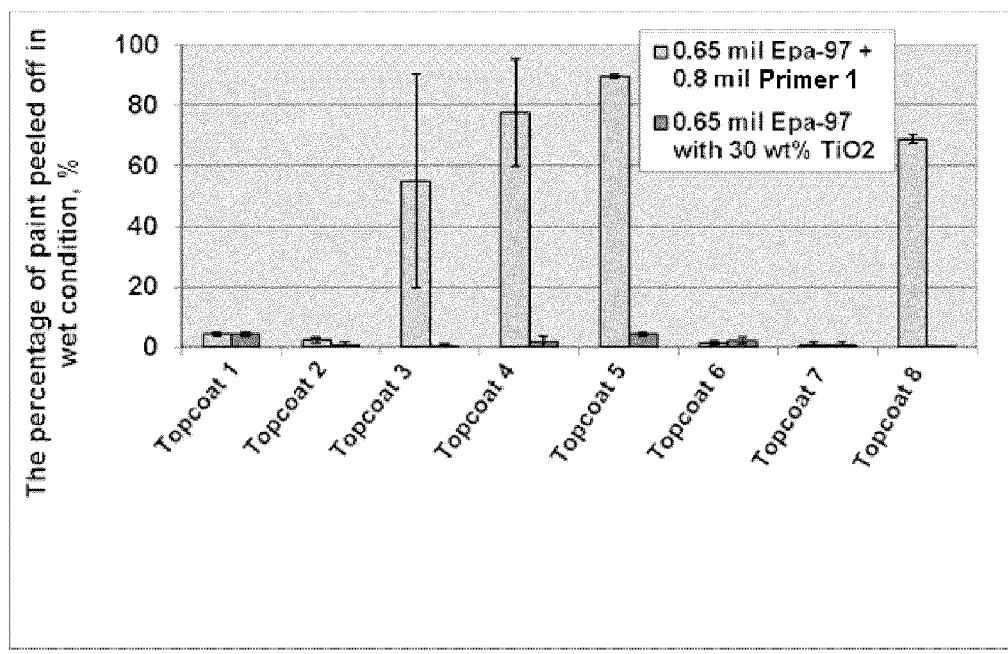
FIG. 3 depicts a representative bar graph showing the wet adhesion of a tinted water based sealer formulation described herein with different house paints on a face of a composite building material

In the following example, a number of fiber cement planks were treated with the coating agent described in the present disclosure as prepared below and then painted with various topcoats. Each of these fiber cement planks were tested as outlined above. A control was provided using a water based epoxy sealing agent and to which a priming agent was applied and then the same topcoats that were applied to the coating agent described in the disclosure. A comparison of the adhesion of topcoats to the coating agent prepared according to the present disclosure and the corresponding control is shown in FIG. 3.

Preparation of Control Samples:

a water based two part epoxy resin having suitable adhesive properties towards cementitious substrates (Control).

The Control was applied to 3 inches×8.25 inches of fiber cement plank samples such that the dry film thickness of the coating was approximately 0.65 mils. The coated samples were dried in the oven at approximately 350° F. The temperature was brought to this level to ensure that the surface of the fiber cement plank reached a temperature above 100° F.

Primer 1 was applied to the Control sealed fiber cement plank samples such that the dry film thickness of the Control sealer was between 0.6 to 0.8 mil DFT. The sealed and primed samples were dried in the oven at approximately 350 F. The temperature was brought to this level to ensure that the surface of the fiber cement plank reached a temperature above 160 F. The sealed and primed samples were then cured at ambient temperatures and conditions for 7 days.

Preparation of Coating Samples:

Coating agent 1 comprises a water based two-part epoxy resin and a pigment Titanium Dioxide ($TiO_2$).

Coating Sample 1 was formed as follows: 2.14 g of 70% solid $TiO_2$ slurry and 14 g of 25% solid water based two-part epoxy resin mixed with 3.86 g of water were combined to form a tinted coating agent having 30% $TiO_2$ pigment.

Coating Sample 2 was formed as follows: 7.15 g of 70% solid $TiO_2$ slurry and 20 g of 25% solid water based two-part epoxy resin were combined to form a tinted coating agent having 50% $TiO_2$ pigment. Coating sample 2 was applied to 3 inches×8.25 inches of fiber cement plank samples such that the dry film thickness of the coating was approximately 0.65 mils. The coated samples were dried in the oven at approximately 350 F. The temperature was brought to this level to ensure that the surface of the fiber cement plank reached a temperature above 100 F. The fiber cement plank samples coated with coating samples 2 were then cured at ambient temperatures and conditions for 7 days.

QUV Test:

Both the control and the coating sample 2 coated fiber cement planks were placed in a QUV chamber for UV exposure test. The results shown in Table 1 below and as illustrated in FIG. 1 show that the cementitious products coated with Coating Sample 2 had much better color stability than the control samples.

TABLE 1

COLOR CHANGE IN QUVA EXPOSURE

| Control | | Coating Sample 2 | |
|---|---|---|---|
| Time in QUVA exposure Hours | Delta b | Time in QUVA exposure Hours | Delta b |
| 0 | 0 | 0 | 0 |
| 870 | −1.16 | 102 | 0.04 |
| 1069 | −1.37 | 213 | −0.03 |
| | | 527 | −0.03 |
| | | 1019 | −0.1 |

Figure 2:
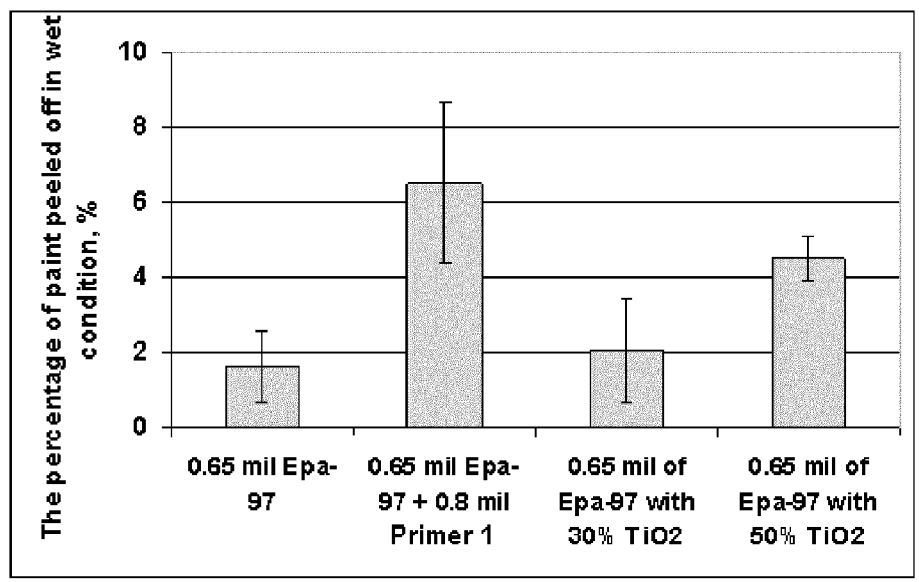
FIG. 2 depicts a representative bar graph showing the wet adhesion of a tinted water based sealer formulation described herein when applied at varying amount of pigment on a face of a composite building material.

Wet Adhesion Test:

Topcoat 0 was applied to cured fiber cement plank samples such that the dry film thickness of topcoat 0 was between 1.6 and 1.9 mils. Topcoat 0 was a water based top coat. Each specimen coated with topcoat 0 was soaked for approximately 24 hours in water. The wet adhesion test was performed as outlined in the general testing information given above. The results of this test are shown in FIG. 2 above. The percentage of paint removed by the tape was less than 5% for all fiber cement plank samples including the control.

Further topcoats were applied to fiber cement plank samples coated with the coating agent prepared in accordance with the present disclosure and the control such that the dry film thickness of each topcoat was between 2 and 4 mil DFT. The further topcoats are as follows:

A. Topcoat 1 was an air dry top coat;
B. Topcoat 2 was a standard air dry house paint;
C. Topcoat 3 was an second air dry house paint;
D. Topcoat 4 was an air dry satin house paint;
E. Topcoat 5 was an exterior air dry satin paint;
F. Topcoat 6 was a premium air dry satin house paint;
G. Topcoat 7 was a second air dry satin house paint; and
H. Topcoat 8 was a third air dry satin house paint.

Each topcoat coated sample was cured under ambient conditions for approximately seven days. The samples were soaked for approximately 24 hours in water for the wet paint adhesion test as outlined above in general testing information. As shown in FIG. 3, the topcoats exhibited better adhesion to the cementitious products coated with Coating sample 2 than the control samples.

Example 2

In the following example a number of fiber cement planks were treated with the coating agent described in the present disclosure as prepared below and then painted with a single topcoat. Each of these fiber cement planks were tested as outlined above. A control was provided using a water based two part epoxy sealing agent and to which a priming agent was applied and the same topcoat that was applied to the coating agent described in the disclosure.

Preparation of Control Samples:

The control is a water based two parts epoxy. The control exhibits suitable adhesion to cementitious substrate.

1.34 g of control was applied to 4 inches×7.25 inches of fiber cement plank samples having a thickness of approximately 5/16 inch. The coated samples were dried in an oven at approximately 400 F. The temperature of the board surface was brought to between 130 and 160 F.

Primer 2 was applied to the samples and dried in an oven at approximately 400 F. The temperature of the board surface was brought to between 160 and 180 F.

2 and 4 mil of topcoat 10 was then applied to the cooled and coated fiber cement plank samples. The plank samples coated with topcoat 10 were cured at ambient temperatures and conditions for a period of approximately 7 days.

Preparation of Coating Samples:

Coating agent 2 was prepared with 23% solids comprising 86% of a water based two-part epoxy resin, 10.3% $TiO_2$, 2.8% yellow oxide and 0.9% black pigment.

Coating agent 3 was prepared with 23% solid comprising 96.3% of a water based two-part epoxy resin, 2.8% yellow oxide and 0.9% black pigment.

Coating agent 4 was prepared with 23% solid comprising a water based two-part epoxy resin only.

About 1.34 g of Coating sample 2 with 23% solid was applied to 4 inches×7.25 inches of fiber cement plank samples having a thickness of approximately 5/16 inch. The coated samples were dried in an over at approximately 400 F. The temperature of the board surface was brought to between 160 and 180 F.

About 1.6 to 1.9 mil of topcoat 9 was then applied to the cooled and coated fiber cement plank samples. The plank samples coated with topcoat 9 were cured at ambient temperatures and conditions for a period of approximately 7 days.

Wet Adhesion Test:

Each specimen coated with topcoat 9 was soaked for approximately 24 hours in water. The wet adhesion test was performed as outlined in the general testing information given above. The percentage of paint removed by the tape was between 2% and 5% for all fiber cement plank samples including the control.

Further wet adhesion tests were performed on the samples coated with the coating agent 2, 3, and 4. Various topcoats as outlined below were applied to fiber cement plank samples coated with the coating agent 2, 3, and 4 such that the dry film thickness of each topcoat was between 2 and 4 mil DFT.

I. Topcoat 10 was a fourth air dry satin house paint;
J. Topcoat 11 was a fifth air dry satin house paint;
K. Topcoat 12 was a sixth air dry satin house paint.

Each topcoat coated sample was cured under ambient conditions for approximately seven days. The samples were soaked for approximately 24 hours in water for the wet paint adhesion test as outlined above in general testing information. The average percentage of paint removed by the tape was less than 10% for all above house paints coated with Coating Agent 2 and 19% for the control samples comprising a water based two-part epoxy resin, primer and Topcoat 10. The samples were also in freeze thaw for 25 cycles after they were soaked for approximately 24 hours in water for the freeze thaw adhesion paint test.

Table 2 summarizes the results of the freeze thaw adhesion test without exposure. As shown by Table 2, coating agent 2, coating agent 3, and coating agent 4 each exhibited improved adhesion as compared to the control.

TABLE 2

FREEZE THAW ADHESION WITHOUT UV EXPOSURE

| | Adhesion picking after freeze thaw, % (without UV exposure) | | | |
|---|---|---|---|---|
| | Control | Coating agent 2 | Coating agent 3 | Coating agent 4 |
| Top coat 11 | 98.8 ± 1.8 | 14.5 ± 12.6 | 10.3 ± 2.8 | 10.0 ± 3.0 |
| Top coat 12 | 70.7 ± 29.9 | 15.4 ± 8.0 | 5.5 ± 2.9 | 11.0 ± 4.4 |
| Top coat 13 | 60.7 ± 26.1 | 19.6 ± 18.8 | 7.0 ± 4.3 | N/A |

The samples were also examined via the QUV test as discussed above, and the results are summarized in Table 3. After 1269 hours of QUVA exposure (equivalent 7.6 months UV in Florida), coating agent 2 (having $TiO_2$) exhibited improved adhesion compared to the control, coating agent 3 (with no no $TiO_2$), and coating agent 4 (with no no $TiO_2$). Thus, $TiO_2$ may be important for UV resistance. Coating agent 3 with yellow and black pigments exhibited slightly better adhesion than coating agent 4, which had no pigments, after the UV exposure. Consequently, black and yellow pigments may also improve UV resistance.

TABLE 3

FREEZE THAW ADHESION AFTER 1269 HOURS EXPOSURE IN QUV CHAMBER

| | Adhesion picking after freeze thaw, % (with 1269 hrs exposure in QUVA) | | | |
|---|---|---|---|---|
| | Control | Coating agent 2 | Coating agent 3 | Coating agent 4 |
| Top coat 11 | 90.8 ± 8.6 | 25.0 ± 11.0 | 77.5 ± 2.9 | 92.0 ± 5.0 |
| Top coat 12 | 82.5 ± 6.5 | 18.0 ± 13.0 | 45.0 ± 24.5 | 70.0 ± 5.0 |

Example 3

In the following example a number of fiber cement planks were treated with the coating agent in accordance with the present disclosure as prepared below and then painted with various topcoats. Each of these fiber cement planks were tested as outlined below. A control was provided using a polyurethane sealing agent.

Preparation of the Control Samples:

Sealing agent 1 is a polyurethane resin which exhibits excellent adhesion to the cementitious substrate mentioned below.

About 2 mil DFT of sealing agent 1 was applied to 5/16 inches×3 inches×6 inches of fiber cement plank. The sealed specimens were cured at ambient condition for 7 days.

Preparation of Coating Samples:

Coating agent 3 comprises sealing agent 1 mixed with a chemical agent.

Coating Sample 3 comprises 45 g sealing agent 1 mixed with 5 g of oven dried Titanium Dioxide to obtain 10 wt % of Titanium Dioxide in the coating sample.

Coating Sample 4 comprises 45 g sealing agent 1 mixed with 10 g of oven dried Calcium Carbonate to obtain 50 wt % of Calcium Carbonate in the coating sample.

About 2 mil DFT of coating sample 3 and 4 was applied to separate samples of 5/16 inches×3 inches×6 inches of fiber cement plank. The sealed specimens were cured at ambient condition for 7 days.

The dry adhesion tape test follows the same process as the wet adhesion test outlined above without the step of soaking the samples in water for approximately 24 hours. The results of the dry adhesion tape test are shown in Table 4. The percentage of coating removed by the tape was zero for all.

TABLE 4

THE PERCENTAGE OF SEALING AGENT/COATING SAMPLE PEELED OFF ON CEMENTITIOUS PRODUCTS IN DRY CONDITION

| Coatings | The percentage of sealer peeled off in dry condition, % |
| --- | --- |
| 2 mil DFT of Sealing Agent 1 | 0 |
| 2 mil DFT of Coating Sample 1 with 10 wt % TiO2 | 0 |
| 1.4 mil DFT of Coating Sample 2 with 50 wt % Calcium carbonate | 0 |

Wet Adhesion Test:

Each specimen was then coated with topcoat 14 such that the dry film thickness was approximately 2 mil DFT. The coated samples were soaked for approximately 24 hours in water. The wet adhesion test was performed as outlined in the general testing information given above. The results of the tests are outlined in Table 3 below. The percentage of paint removed by the tape was 0% for all fiber cement plank samples including the control.

QUV Test:

The control and coated samples were placed in a QUV chamber for approximately 336 hours for UV exposure testing. The control and coated samples were then coated with topcoat 14 such that the dry film thickness was approximately 2 mil DFT. The coated samples were soaked for approximately 24 hours in water. The wet adhesion test was performed as outlined in the general testing information given above. The results of the tests are outlined in Table 5 below. The percentage of paint removed by the tape was 5% for coating sample 3 and 30% for the control.

TABLE 5

THE PERCENTAGE OF PAINT PEELED OFF ON CEMENTITIOUS PRODUCTS WITH TINTED SEALER IN WET CONDITION

| | The percentage of paint peeled off in wet condition, % | |
| --- | --- | --- |
| Coatings | W/o UV exposure | W/336 hrs QUVA exposure on sealed plank |
| No Sealing Agent + 2 mil Topcoat 14 | 60 | Not tested |
| 2 mil DFT of Contol + 2 mil Topcoat 14 | 0 | 30% |
| 2 mil DFT of Coating Sample 3 with 10% TiO2 + 2 mil Topcoat 14 | 0 | 5% |
| 1.4 mil DFT of Coating Sample 4 with 50 wt % Calcium carbonate + 2 mil Topcoat 14 | 0 | Not tested |

Example 4

In the following example a number of fiber cement planks were treated with the coating agent described in the present disclosure as prepared below and then painted with various topcoats. Each of these fiber cement planks were tested as outlined below. A control was provided using a water based acrylic sealing agent.

Preparation of the Control Samples:

Sealing agent 2 is a water based emulsion which exhibits excellent adhesion to the cementitious substrate mentioned below.

1 mil DFT of sealing agent 2 was applied to 3 inches×8.25 inches of fiber cement plank. The coated samples were dried in an oven at approximately 350 F such that the temperature of the board surface was brought to above 100 F. About 2 mils of topcoat 15 was then applied on to the coated samples.

Preparation of Coating Samples:

Coating agent 4 comprises 1.2 g of calcium carbonate filler mixed with 10 g of 30% solid mixture of sealing agent 2 with obtain coating agent 4 with 28.6% of calcium carbonate filler.

1 mil DFT of coating agent 4 was applied to 3 inches×8.25 inches of fiber cement plank. The coated samples were dried in an oven at approximately 350 F such that the temperature of the board surface was brought to above 100 F. 2 mils of topcoat 15 was then applied on to the coated samples.

The control samples and the samples coated with coating agent 4 were soaked for approximately 24 hours in water. The wet adhesion test was performed as outlined in the general testing information given above. The average percentage of paint removed by the tape was 15% for samples coated with coating agent 4 and 6% for the control samples.

Example 5

Formulation of Coating Agent 5

Polymeric hexamethylene isocyanate (PHDI) mixed with color pigment with 5 to 10% $TiO_2$ having a solid content at 100%. Coating agent 5 is applied to the composite product at a dry film thickness of 0.4 to 1 mil. The coating is cured on the fiber cement composite product at 140 F for approximately 3 to 4 hrs.

Example 6

Formulation of Coating Agent 6

A water based two-part epoxy resin was mixed with color pigment with 5 to 10% $TiO_2$ having a solid content between 10 to 30%. Coating agent 6 is applied to the composite product at a dry film thickness of 0.3 to 0.5 mil. The coating is cured on the fiber cement composite product at 160 F to 180 F of board surface temperature.

Example 7

Formulation of Coating Agent 7

A water based styrene acrylic latex mixed with color pigment with 5 to 50% $TiO_2$ having a solid content between 10 to 20%. Coating agent 7 is applied to the composite product at a dry film thickness of 0.45 to 0.55 mil. The coating is cured on the fiber cement composite product at 160 F to 180 F of board surface temperature.

It will of course be understood that the invention disclosed herein is not limited to the specific details described herein, which are given by way of example only, and that various modifications and alterations are possible within the scope of the invention.

What is claimed is:

1. A coating agent comprising:
at least one water-based epoxy resin;
5%-10% by weight titanium dioxide pigment;
at least one additional pigment selected from the group consisting of inorganic pigment and organic pigment;
at least one filler selected from the group consisting of natural mineral and synthetic mineral; and
wherein the pigment volume concentration is less than 5%, wherein the coating agent comprises less than or equal to 23% by weight solids, said coating agent forming substantially non-porous sealing coating having a dry film thickness of between 0.05 mil and 5 mils, and
wherein the at least one resin is UV curable.

2. The coating agent of claim 1, wherein the at least one water-based resin comprises a component that is selected from the group consisting of aromatic isocyanates, aliphatic isocyanates, blocked isocyanates, an epoxy, silicones, siloxanes, silanes, polyurethanes, acrylates, acrylics, polyester, fluoropolymers, fluorinated acrylics, styrene acrylics, and combinations thereof.

3. The coating agent of claim 1, wherein the at least one resin is moisture curable.

4. The coating agent of claim 1, wherein the at least one resin comprises resin solids between 2.0%±0.5% and 23%±0.5% of the coating agent by weight.

5. The coating agent of claim 1, wherein the natural mineral comprise oxides, silicates, titanates, carbonates, sulfates and hydroxides.

6. The coating agent of claim 5, wherein the oxides comprise oxides of silicon, aluminium, magnesium, titanium, iron, zinc, yttrium and zirconium.

7. The coating agent of claim 6, wherein the silicates comprise silicates and hydrated silicates.

8. The coating agent of claim 5, wherein the synthetic mineral comprise oxides, silicates, titanates, carbonates, carbides, sulfates and hydroxides.

9. The coating agent of claim 1, wherein the at least one filler comprises between 0.5%±0.5% and 80%±0.5% of the formulation of the coating agent by weight.

10. The coating agent of claim 1, wherein the inorganic pigment is selected from the group comprising Han Purples, Ultramarines, Cobalt Violets, Cobalt Blues, Cerulean Blues, Egyptian Blues, Han Blues, Prussian Blues, Azurites, Malachites, Cadmium Greens, Viridians, Verdigris, Chrome Greens, Paris Greens, Scheele's Greens, Orpiments, Cadmium Yellows, Chrome Yellows, Cobalt Yellows, Yellow Ochres, Naples Yellows, Titanium Yellows, Titanium Beiges, Cadmium Oranges, Chrome Oranges, Cadmium Reds, Venetian Reds, Red Ochres, Burnt Siennas, Vermilions, Red Leads, Burnt Ochres, Raw Umbers, Burnt Umbers, Raw Siennas, Carbon Blacks, Ivory Blacks, Vine Blacks, Lamp Blacks, Iron Blacks, Titanium Blacks, Antimony Whites, Barium Sulfates, White Leads, Titanium Whites, and Zinc Whites.

11. The coating agent of claim 1, wherein the organic pigment is selected from the group comprising Fast Yellows, Permanent Yellows, Brilliant Yellows, Fast Oranges, Permanent Oranges, Toluidene Reds, Permanent Reds, Scarlet Reds, Fast brilliant Reds, Fast Rose Reds, Fast Reds, Red Lakes, Carmine Reds, Lithol Rubbines, Fast Bordeaux, Fast Pinks, Fast Violets, Cyanine Blues, and Cyanine Greens.

12. The coating agent of claim 1, wherein the at least one additional pigment is present at a total of 2%±0.5% and 10%±0.5% of the coating agent by weight.

13. The coating agent of claim 1, wherein the at least one additional pigment comprises Titanium Dioxide and at least one other pigment is selected from the group comprising inorganic pigment and organic pigment, wherein the inorganic pigment is selected from the group comprising Han Purples, Ultramarines, Cobalt Violets, Cobalt Blues, Cerulean Blues, Egyptian Blues, Han Blues, Prussian Blues, Azurites, Malachites, Cadmium Greens, Viridians, Verdigris, Chrome Greens, Paris Greens, Scheele's Greens, Orpiments, Cadmium Yellows, Chrome Yellows, Cobalt Yellows, Yellow Ochres, Naples Yellows, Titanium Yellows, Titanium Beiges, Cadmium Oranges, Chrome Oranges, Cadmium Reds, Venetian Reds, Red Ochres, Burnt Siennas, Vermilions, Red Leads, Burnt Ochres, Raw Umbers, Burnt Umbers, Raw Siennas, Carbon Blacks, Ivory Blacks, Vine Blacks, Lamp Blacks, Iron Blacks, Titanium Blacks, Antimony Whites, Barium Sulfates, White Leads, Titanium Whites, and Zinc Whites, and the organic pigment is selected from the group comprising Fast Yellows, Permanent Yellows, Brilliant Yellows, Fast Oranges, Permanent Oranges, Toluidene Reds, Permanent Reds, Scarlet Reds, Fast brilliant Reds, Fast Rose Reds, Fast Reds, Red Lakes, Carmine Reds, Lithol Rubbines, Fast Bordeaux, Fast Pinks, Fast Violets, Cyanine Blues, and Cyanine Greens.

14. The coating agent of claim 1, wherein the at least one water-based epoxy resin comprises a hydrophilic polymeric hexamethylene isocyanate.

* * * * *